(12) United States Patent
Fergusson

(10) Patent No.: US 7,037,058 B2
(45) Date of Patent: May 2, 2006

(54) RESIN EMBEDDED ROCK BOLT

(75) Inventor: Jeffrey R. Fergusson, Glenorie (AU)

(73) Assignee: Industrial Roll Formers Pty. Ltd., Smithfield (AU)

( * ) Notice: Subject to any disclaimer, the term of this patent is extended or adjusted under 35 U.S.C. 154(b) by 0 days.

(21) Appl. No.: 10/201,397

(22) Filed: Jul. 23, 2002

(65) Prior Publication Data

US 2003/0031525 A1  Feb. 13, 2003

Related U.S. Application Data

(63) Continuation-in-part of application No. 09/701,231, filed on Mar. 21, 2001, now Pat. No. 6,447,228.

(51) Int. Cl.
*F16B 39/02* (2006.01)

(52) U.S. Cl. .......................... 411/82; 405/259.5; 405/75

(58) Field of Classification Search ............ 411/451.1, 411/451.2, 451.4, 452, 922, 75, 76, 82, 82.3; 405/259.5, 259.6
See application file for complete search history.

(56) References Cited

U.S. PATENT DOCUMENTS

| | | | |
|---|---|---|---|
| 2,006,813 A * | 7/1935 | Norwood | |
| 2,898,964 A * | 8/1959 | Masters | |
| 3,021,745 A * | 2/1962 | Libom | |
| 3,091,991 A * | 6/1963 | Baker | |
| 3,108,443 A | 10/1963 | Schuermann et al. | |
| 3,641,772 A | 2/1972 | Dietrich | |
| 3,797,254 A | 3/1974 | Askey et al. | |
| 3,859,889 A * | 1/1975 | Fischer | |
| 4,127,000 A | 11/1978 | Montgomery, Jr. et al. | |
| 4,343,399 A | 8/1982 | Patel et al. | |
| 4,430,025 A | 2/1984 | Ciavatta | |
| 4,432,682 A | 2/1984 | McKewan | |
| 4,564,315 A | 1/1986 | Rozanc | |
| 4,652,194 A | 3/1987 | Tajima et al. | |
| 4,744,699 A | 5/1988 | Price et al. | |
| 4,820,095 A | 4/1989 | Mraz | |
| 4,850,746 A | 7/1989 | Finsterwalder et al. | |
| 5,011,354 A * | 4/1991 | Brownlee | |
| 5,054,146 A * | 10/1991 | Wiesenfeld | |
| 5,076,734 A * | 12/1991 | Hipkins | |
| 5,273,377 A * | 12/1993 | Taylor | |
| 5,387,060 A | 2/1995 | Locotos | |
| 5,562,377 A | 10/1996 | Giannuzzi et al. | |
| 6,033,153 A | 3/2000 | Fergusson | |

FOREIGN PATENT DOCUMENTS

| | | |
|---|---|---|
| AU | A-38991/85 | 2/1985 |
| AU | A-25046/88 | 5/1989 |
| DE | 1 902 045 | 1/1969 |
| DE | 28 43 038 | 4/1980 |
| FR | 2 500 053 | 2/1981 |
| GB | 2 172 682 | 3/1986 |
| GB | 2 206 172 | 6/1987 |
| GB | 2 211 259 | 10/1987 |
| GB | 2 211 260 | 10/1987 |

* cited by examiner

*Primary Examiner*—Flemming Saether
(74) *Attorney, Agent, or Firm*—Arent Fox PLLC

(57) ABSTRACT

A resin embedded rock bolt dimensioned to be inserted into a hole drilled in a rock body with a clearance fit between the bolt and hole, the bolt having a shank which is plastically deformed by the application of an eccentric shear force to form a paddle protruding beyond the undeformed exterior of the shank prior to deformation, the paddle being shaped to mix the resin.

2 Claims, 3 Drawing Sheets

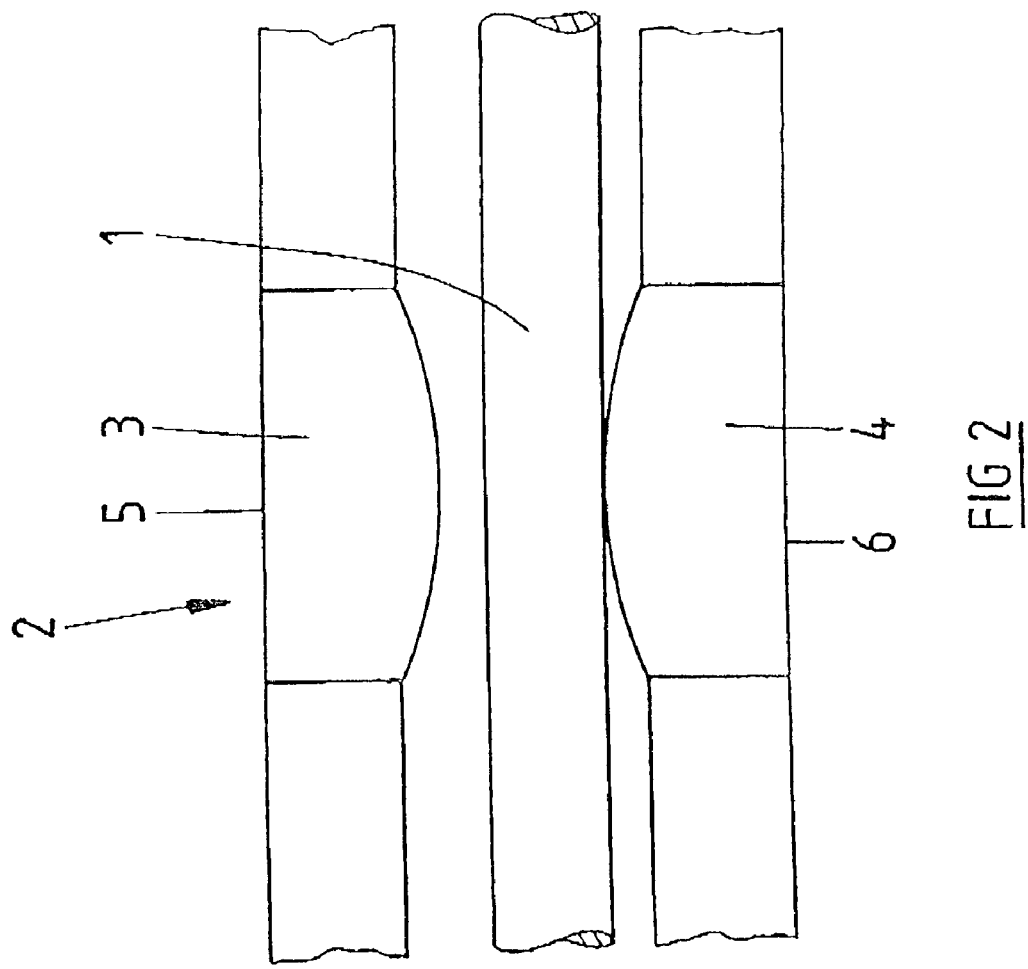
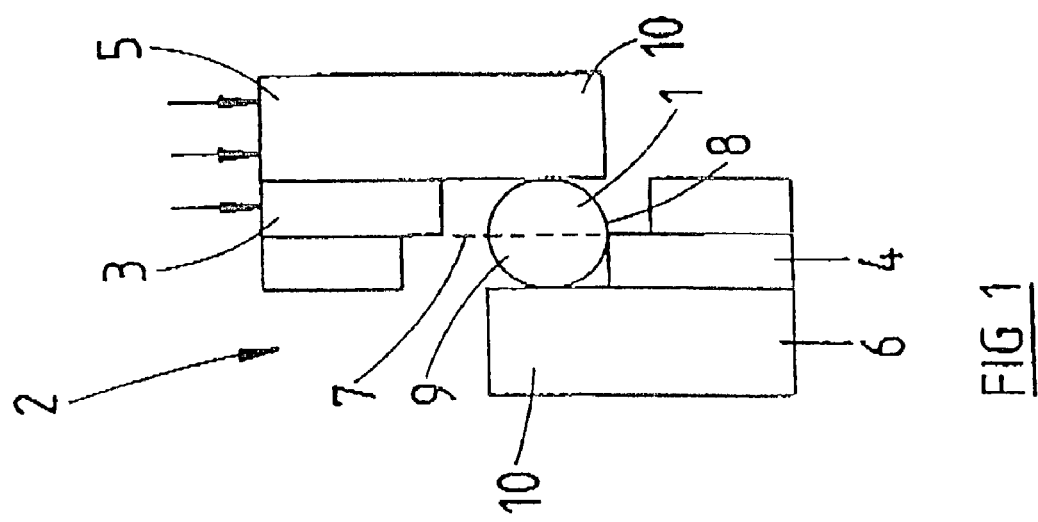

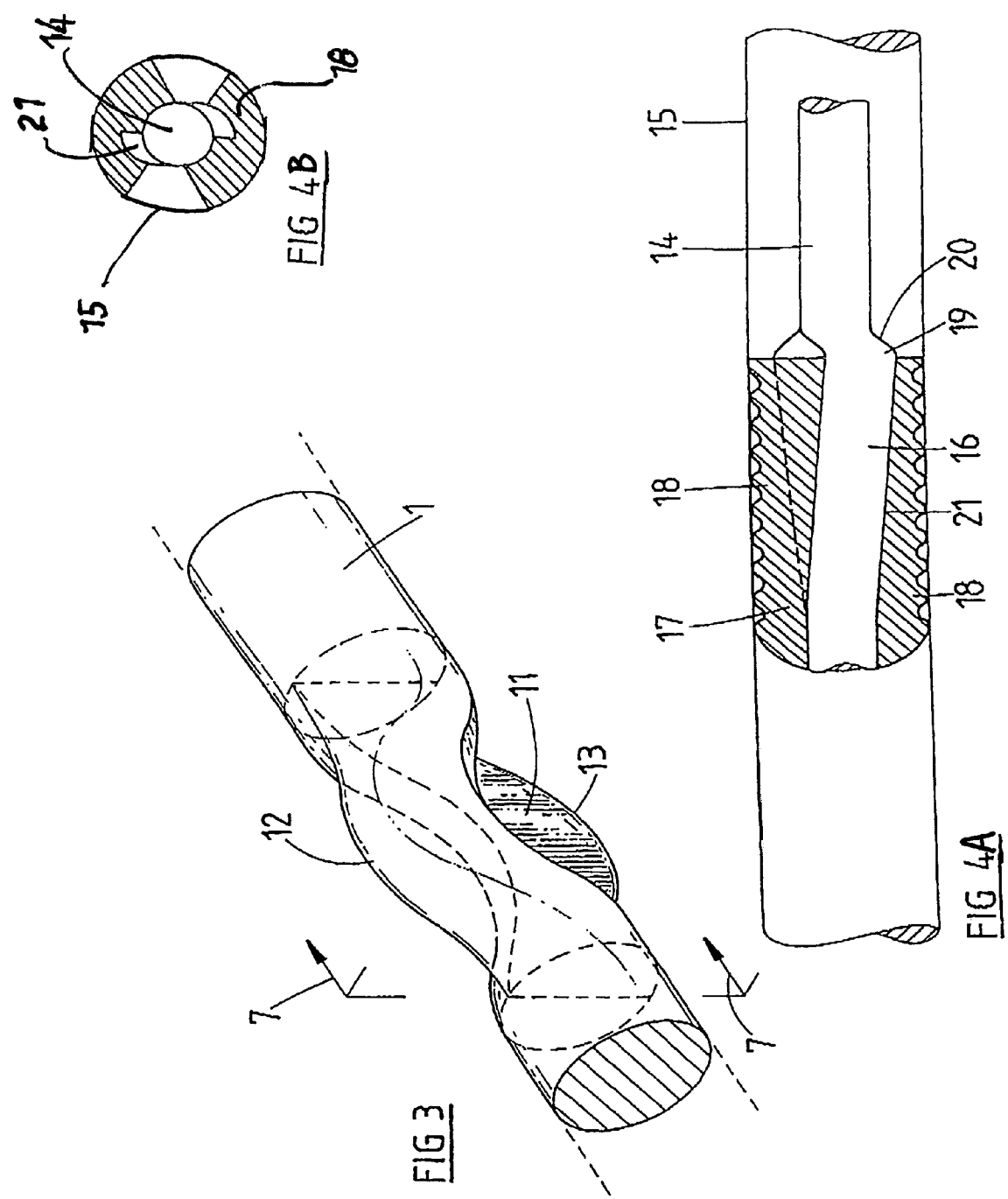

RESIN EMBEDDED ROCK BOLT

CROSS-REFERENCE TO RELATED APPLICATION

This application is a continuation-in-part of U.S. patent application Ser. No. 09/701,231 filed on Mar. 21, 2001 now U.S. Pat. No. 6,447,228, the disclosure of which is incorporated herein by reference.

FIELD OF THE INVENTION

The present invention relates to rock bolts and, in particular, to a resin embedded rock bolt.

BACKGROUND OF THE INVENTION

Resin embedded rock bolts are used in many mining and civil engineering applications, in particular to stabilize rock strata during tunnelling or extractive operations. To install a rock bolt in a mine wall a blind hole is firstly drilled in the wall and a chemical or resin mixture inserted into the hole. The resin is normally contained within a plastic "sausage" with an interior dividing wall which maintains separate the two components which when mixed together cause the resin to set. The bolt is then inserted, and is preferably rotated during insertion, to mix the resin. Naturally, insertion of the bolt pushes the resin "sausage(s)" or cartridge(s) to the far end of the hole, whilst the rotation of the bolt shreds the sheet material from which the sausage or cartridge is fabricated. To enhance mixing, the bolt may be provided with suitable thread form. In the event the diameter of the hole is greater than desired, a mixing device, such as a wire spirally wrapped along the length of the bolt may be provided. Alternatively, a paddle section may be provided by stamping the bolt so as to create lateral protrusions. U.S. Pat. No. 5,054,146 (Wiesenfeld) is illustrative of this stamping art, the protrusions 3 being formed by pins 14 mounted on a pair of rollers 8.

Once rotation of the bolt starts, the resin seals the hole trapping the air around the cartridge in the hole. This air must be mixed into the resin in such a way to evenly distribute its volume. Lateral protrusions of large areas on the bolt tend to cavitate the resin cartridge mixing by drawing the air around the bolt and pushing the high viscosity resin to the outside diameter of the hole. This effectively separates the resin and creates voids. This leads to increased bond failure. The resin setting process is generally thermo reactive so thermal expansion of the air is possible creating larger volume voids or bubbles in the resin.

A disadvantage associated with forming the paddle section by stamping is that substantive compressive load needs to be applied to the bolt. The resultant stresses plastically deform the bolt axially as well as sidewardly of the bolt. Thus, as disclosed in U.S. Pat. No. 5,054,146, the bar requires straightening after formation of the protrusions 3. The sideward displacement of material in the bolt is minimal and control of the shape of the paddle section is difficult to achieve.

It will be appreciated that this mining and tunnelling art is very different from conventional masonry fasteners which are intended to be fixed by a friction fit between the fastener and the interior of the hole into which it is inserted. U.S. Pat. No. 2,006,813 (Norwood) is representative of this friction fit art. It will be seen that the device of Norwood is driven into a hole having a diameter slightly less than the maximum transverse extent of the fastener's shank. The fastener's lateral protrusions are compressed forming a tight friction fit with the hole. It is impossible to rotate the Norwood fastener after insertion and no resin is used in the friction fit art.

OBJECT OF THE INVENTION

It is an object of the invention to provide an improved resin embedded rock bolt which includes a paddle section formed by the application of a shear force.

SUMMARY OF THE INVENTION

In accordance with the present invention there is disclosed a resin embedded rock bolt dimensioned to be inserted into a hole drilled in a rock body with a clearance fit between said bolt and hole, after a shreddable cartridge containing resin constituents has been inserted in said hole, said bolt having a shank portion which is plastically deformed by the application of an eccentric shear force to form at least one paddle section, and said paddle section protruding beyond the undeformed exterior of said shank portion prior to deformation and being shaped to mix said resin constituents.

Preferably the paddle section includes two paddle portions projecting substantially parallel to a centre line bisecting the bolt, the portions being displaced to opposite sides of the bolt and the centre line.

Preferably, the bolt includes an expandable shell mounted to the paddle section, the shell including wedges adapted to be forced outwardly, by axial movement of the paddle portions therethrough, to lock the bolt against a wall of a bolt hole.

Preferably, a plurality of paddle sections are formed along the extent of the bolt.

BRIEF DESCRIPTION OF THE DRAWINGS

Non-limiting examples of the invention will now be described with reference to the accompanying drawings, in which:

FIG. 1 is a diagrammatic cross-sectional view of a press used to form a bolt of the invention;

FIG. 2 is a side view of the press shown in FIG. 1;

FIG. 3 is a perspective view of a bolt in accordance with a first embodiment of the invention;

FIG. 4A is a diagrammatic side view and FIG. 4B is an end view of an alternative bolt, formed in accordance with a second embodiment of the invention.

DETAILED DESCRIPTION

Figure 5:
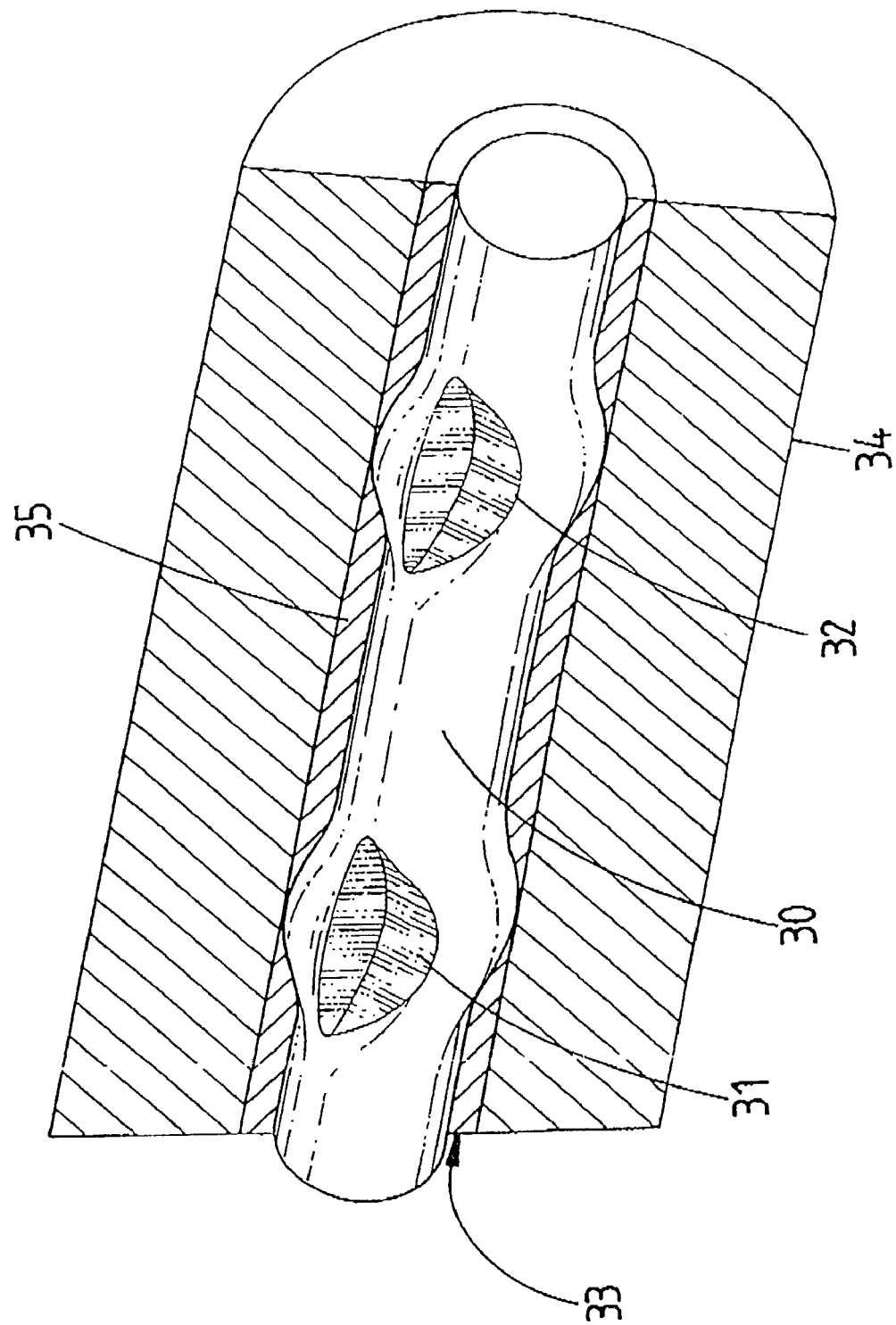
FIG. 5 is a diagrammatic perspective view of a bolt secured in a rock face.

Referring firstly to FIGS. 1 and 2, a bolt 1 is shown in a press 2, which comprises a pair of opposed blades 3, 4 mounted in respective tools 5, 6. The blades 3, 4 are laterally offset, to either side of a centre line 7 which bisects the bolt 1. The blades 3, 4 are shown in FIG. 2 as having a convex profile but can be of any desired shape.

In operation, the bolt 1 is located between the blades 3, 4 and held in a centred position by stop components 10 of the tools 5, 6 which extend lengthwise of the bolt 1. The tools are then brought together so that the blades 3, 4 engage the bolt 1 from opposed sides thereof, to either side of the centre line 7. A shear force is thus applied via the blades 3, 4. A lower portion 8 on the lower right hand side of the bar, as viewed in FIG. 1, is deformed downwardly and an upper left hand portion 9 is deformed upwardly, to produce a paddle section in the bolt. The stop components 10 inhibit sideward deformation of the portions 8, 9, during application of the shear force.

The resultant paddle section 11 is shown in FIG. 3 as including two paddle portions 12, 13 which are displaced laterally of the bar in the direction generally parallel to the centre line 7, with the portions 12, 13 arranged on opposite sides of the centre line 7. The paddle portions 12, 13 (being displaced laterally of the bolt) render the paddle section suitable for mixing resin between the bolt and a wall of a hole, where the difference in diameter between the bolt and the hole wall would otherwise have been too large to obtain sufficient mixing of the resin by rotation of the bolt alone, without provision of the paddle section.

In FIG. 4A and 4B, a bolt 14 is shown in a hole 15. The bolt includes an alternatively shaped paddle section 16, to which is mounted an expandable shell 17 with outwardly displaceable wedges 18 which are used to engage the interior of the hole for locating the bolt in the hole. The paddle section 16 includes a paddle portion 19 which is substantially displaced laterally of the bolt axis toward only one end 20 to provide a ramp section 21. The ramp section 21 is utilized to engage with the uppermost wedge 18 of the shell 17 such that movement of the bolt 14 to the right as seen in FIG. 4 forces the wedge 18 against the hole 15 to lock the shell 17 and, thereby the bolt 14, in place.

FIG. 5 illustrates a bolt 30, formed in a similar fashion to the bolt 1, except with the provision of two paddle sections 31, 32 instead of a single section 11. The bolt is shown installed in a bolt hole 33 formed in a rock face. The bolt 30 is secured in the hole 33 with a resin 35, previously mixed by the paddle sections.

It will be appreciated from the above, that the shape and configuration of the blades can be varied, as required. It is possible that only one blade need be used thus forming a paddle section with a single paddle portion. The invention also allows for a considerable degree of control over the shape and size of the paddle portion(s), through use of shear forces to form the paddle section(s), as opposed to a straight compressive force in the prior art. Further, the paddle section of the bolt can be suitably configured to cooperate with an expandable shell for anchoring a bolt in a hole.

Many modifications and variations may be made to the above described bolt without departing from the spirit and scope of the invention.

The invention claimed is:

1. The resin embedded rock bolt dimensioned to be inserted into a hole drilled in a rock or mineral body and co-operable with a shreddable cartridge containing resin constituents inserted in said hole, with a clearance fit between said bolt and said hole, said resin embedded rock bolt comprising a substantially undeformed solid shank portion having an exterior, a longitudinal axis, and at least one pair of plastically shear deformed, directly opposed paddle portions being shaped to mix said resin constituents, each said paddle portion protruding beyond the exterior of said undeformed shank portion, being offset from said longitudinal axis and comprising a surface lying in a plane parallel to said longitudinal axis, wherein said plane passes through said longitudinal axis.

2. The resin embedded rock bolt as claimed in claim 1 wherein there are a plurality of pairs of said directly opposed paddle portions located on said shank portion, each said pair of opposed paddle portions being spaced apart along said shank portion.

* * * * *